United States Patent
Nagashima

(10) Patent No.: US 12,411,084 B2
(45) Date of Patent: Sep. 9, 2025

(54) TRANSMISSION TYPE OPTICAL MEASUREMENT DEVICE HAVING IMPROVED MEASUREMENT ACCURACY

(71) Applicant: Ushio Denki Kabushiki Kaisha, Tokyo (JP)

(72) Inventor: Toshikazu Nagashima, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/554,145

(22) PCT Filed: Mar. 15, 2022

(86) PCT No.: PCT/JP2022/011500
§ 371 (c)(1),
(2) Date: Oct. 5, 2023

(87) PCT Pub. No.: WO2022/215454
PCT Pub. Date: Oct. 13, 2022

(65) Prior Publication Data
US 2024/0201085 A1    Jun. 20, 2024

(30) Foreign Application Priority Data
Apr. 7, 2021 (JP) ................. 2021-065270

(51) Int. Cl.
*G01N 21/49* (2006.01)
*G01N 21/25* (2006.01)
*G01N 21/84* (2006.01)

(52) U.S. Cl.
CPC .......... *G01N 21/49* (2013.01); *G01N 21/255* (2013.01); *G01N 21/84* (2013.01);
(Continued)

(58) Field of Classification Search
CPC ...... G01N 21/49; G01N 21/255; G01N 21/84; G01N 2021/845; G01N 2201/0636;
(Continued)

(56) References Cited

U.S. PATENT DOCUMENTS

| | | | |
|---|---|---|---|
| 2009/0097019 A1 | 4/2009 | Baker | |
| 2015/0241241 A1* | 8/2015 | Cudak | ................ G06Q 30/0284 |
| | | | 701/408 |

(Continued)

FOREIGN PATENT DOCUMENTS

| | | | |
|---|---|---|---|
| CN | 205005846 U | * | 2/2016 |
| CN | 106770346 A | * | 5/2017 |

(Continued)

OTHER PUBLICATIONS

Tine Ringsted, "Near infrared spectroscopy of food systems using a supercontinuum laser", Ph.D. thesis 2017, Department of Food Science, Faculty of Science, University of Copenhagen, Denmark, 2017, pp. 1-150.

(Continued)

*Primary Examiner* — Michelle M Iacoletti
*Assistant Examiner* — Maher Yazback
(74) *Attorney, Agent, or Firm* — Studebaker Brackett PLLC

(57) ABSTRACT

A conveyance device supports and conveys an object. The conveyance device has a support portion in which an opening narrower than the object is provided at a position where the object is supported. A lighting device irradiates a first surface of the object with measurement light having a wavelength changing over time through the opening of the support portion. A light receiving device detects object light that is diffusely transmitted light emitted from a second surface of the object.

6 Claims, 13 Drawing Sheets

(52) U.S. Cl.
CPC ............... *G01N 2021/845* (2013.01); *G01N 2201/0636* (2013.01); *G01N 2201/0638* (2013.01); *G01N 2201/0697* (2013.01); *G01N 2201/1042* (2013.01)

(58) Field of Classification Search
CPC ... G01N 2201/0638; G01N 2201/0697; G01N 2201/1042; G01N 21/8806; G01N 21/474; G01N 2021/4707; G01N 2021/4735; G01N 2021/8845; G01N 21/359; G01N 2021/8835; G01N 2201/04; G01N 2201/06113; G01N 2201/0696; G01N 21/25
See application file for complete search history.

(56) References Cited

U.S. PATENT DOCUMENTS

| | | | | |
|---|---|---|---|---|
| 2017/0059477 | A1* | 3/2017 | Feitisch | G01J 3/42 |
| 2019/0195783 | A1* | 6/2019 | Kawano | G01J 3/504 |
| 2020/0378899 | A1* | 12/2020 | Cho | G01N 21/455 |
| 2021/0223185 | A1* | 7/2021 | Van Olmen | G01N 21/255 |
| 2021/0276751 | A1* | 9/2021 | Blanc | G01N 21/01 |
| 2021/0358120 | A1* | 11/2021 | Nomura | G06T 7/62 |
| 2022/0170791 | A1 | 6/2022 | Yamada et al. | |
| 2022/0178848 | A1 | 6/2022 | Yamada et al. | |
| 2022/0291118 | A1* | 9/2022 | Taniguchi | G01N 21/474 |

FOREIGN PATENT DOCUMENTS

| | | | | |
|---|---|---|---|---|
| CN | 117589696 A | * | 2/2024 | G01N 21/25 |
| DE | 102022002963 A1 | * | 2/2024 | G01N 21/21 |
| JP | H04-299238 A | | 10/1992 | |
| JP | 2004-125597 A | | 4/2004 | |
| JP | 3978112 B2 | | 9/2007 | |
| JP | 2012122876 A | * | 6/2012 | |
| JP | 2020-159971 A | | 10/2020 | |
| JP | 2020-159973 A | | 10/2020 | |
| WO | WO-2018041902 A1 | * | 3/2018 | B07C 5/3425 |
| WO | WO-2018135231 A1 | * | 7/2018 | G01N 21/3563 |

OTHER PUBLICATIONS

Ringsted T. et al., "First trial with an all-fibre near infrared spectrometer evaluated by multivariate curve resolution", Proceedings of the 18th International Conference on Near Infrared Spectroscopy, IM Publications Open, Nov. 2019, pp. 169-175.

The extended European search report issued by the European Patent Office on Aug. 2, 2024, which corresponds to European Patent Application No. 22784439.6-1001 and is related to U.S. Appl. No. 18/554,145.

International Search Report issued in PCT/JP2022/011500; mailed Jun. 7, 2022.

International Preliminary Report On Patentability (Chapter I) and Written Opinion of the International Searching Authority issued in PCT/JP2022/011500; issued Oct. 10, 2023.

An Office Action issued by Taiwan Intellectual Property Office on Feb. 13, 2025, which corresponds to Taiwanese Patent Application No. 111109868 and is related to U.S. Appl. No. 18/554,145.

* cited by examiner

TRANSMISSION TYPE OPTICAL MEASUREMENT DEVICE HAVING IMPROVED MEASUREMENT ACCURACY

BACKGROUND

1. Technical Field

The present disclosure relates to an optical measurement device.

2. Description of the Related Art

Spectroscopic analysis is widely used for component analysis and inspection of an object. In the spectroscopic analysis, the object is irradiated with measurement light, and a spectrum of object light obtained as a result of the irradiation is measured. Then, optical characteristics such as reflection characteristics (wavelength dependency) or transmission characteristics can be obtained based on a relationship between the spectrum of the object light and the spectrum of the measurement light.

Spectroscopic analysis is classified into a transmission type in which transmitted light of the object is the object light and a reflection type in which reflected light is the object light. The reflection type is suitable for measuring an object having a high reflectance, but the obtained optical information is limited to the optical information near the surface of the object. Therefore, it cannot be said that the measurement has sufficient accuracy in a measurement of a precise industrial product, a specimen collected from an animal and a plant, a material taken into a human body, a liquid or gas produced in a production plant, or the like as the object.

The transmission type can obtain optical characteristics including not only the surface but also a deep portion of the object, and thus is suitable for a case where a food, a beverage (hereinafter, collectively referred to as food and drink.), or the like is used as the object. Patent Literature 1 (JP2020-159971A) and Patent Literature 2 (JP2020-159973A) disclose product inspection devices of a transmission type. The product inspection devices each includes an irradiation optical system in which a front surface of the product (object to be inspected) is irradiated with pulsed light, and a light receiver provided on a back surface side of the product and configured to receive light transmitted through the product.

The present inventor has studied an inspection device of the transmission type, and as a result, has recognized the following problems. FIG. 1 is a view illustrating an inspection device 1000 of the transmission type studied by the present inventor. Note that the inspection device 1000 should not be recognized as a known technique.

A product P is supported and conveyed by a support means 1400.

As disclosed in Patent Literatures 1 and 2, a lighting device 1200 irradiates an upper surface of the product P with pulsed light (measurement light $S_{IN}$). A light receiver 1300 is provided below the product P and receives object light $S_{OBJ}$ emitted from a bottom surface side of the product P. The object light $S_{OBJ}$ contains diffusely transmitted light as a main component, and is emitted from the entire bottom surface of the product P.

When the support means 1400 is made of a material transparent to the object light $S_{OBJ}$, the cost increases, and thus the support means 1400 opaque to the object light $S_{OBJ}$ may be used. In this case, an opening 1102 for taking out the object light $S_{OBJ}$ is required immediately below the product P of the support means 1400. When the opening 1102 is too large, the product P falls, and thus the size (width) of the opening 1102 is required to be narrower than the product P.

Only the object light $S_{OBJ}$ having passed through the opening 1102 can be incident on the light receiver 1300, and a part of the object light $S_{OBJ}$ of the product P is shielded by the support means 1400. As the width of the opening 1102 is narrowed, the amount (intensity) of the object light $S_{OBJ}$ incident on the light receiver 1300 decreases, leading to a decrease in measurement accuracy.

In order to increase the amount of the object light $S_{OBJ}$ incident on the light receiver 1300, the intensity of the measurement light $S_{IN}$ may be increased. However, depending on the type of the product P, there is a problem that the irradiation with the strong measurement light $S_{IN}$ changes the quality of the product P. Therefore, the intensity of the measurement light $S_{IN}$ with which the product P can be irradiated may have an upper limit $I_{MAX}$. The maximum incident intensity $I_{DET(MAX)}$ on the light receiver 1300 is expressed as $$I_{DET(MAX)} = I_{MAX} \times \alpha \times \beta,$$

where transmittance of the product P is α, and a shielding rate (transmittance) of the support means 1400 is β. Thus, the amount of received light is reduced by the support means 1400. A decrease in the amount of received light leads to a decrease in measurement accuracy.

When a material such as glass is used as the support means 1400, the opening 1102 need not be required, but even in this case, the transmittance β cannot be 100%. Therefore, the maximum incident intensity $I_{DET}$ to the light receiver 1300 is $I_{DET}=I_{MAX} \times \alpha \times \beta$, and the amount of received light is reduced by the support means 1400. A decrease in the amount of received light leads to a decrease in measurement accuracy.

SUMMARY

The present disclosure has been made in view of the above problems, and one of exemplary objects of a certain aspect thereof is to provide an optical measurement device with improved measurement accuracy.

A certain aspect of the present disclosure relates to an optical measurement device. The optical measurement device includes a conveyance device that supports and conveys an object and includes a support portion that supports the object, a lighting device that irradiates a first surface of the object with measurement light having a wavelength changing over time through the support portion, and a light receiving device that detects diffusely transmitted light emitted from a second surface of the object.

Note that any combination of the above components and mutual replacement of the components and expressions of the present disclosure among methods, devices, systems, and the like are also effective as aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Outline of Embodiments

Figure 1:
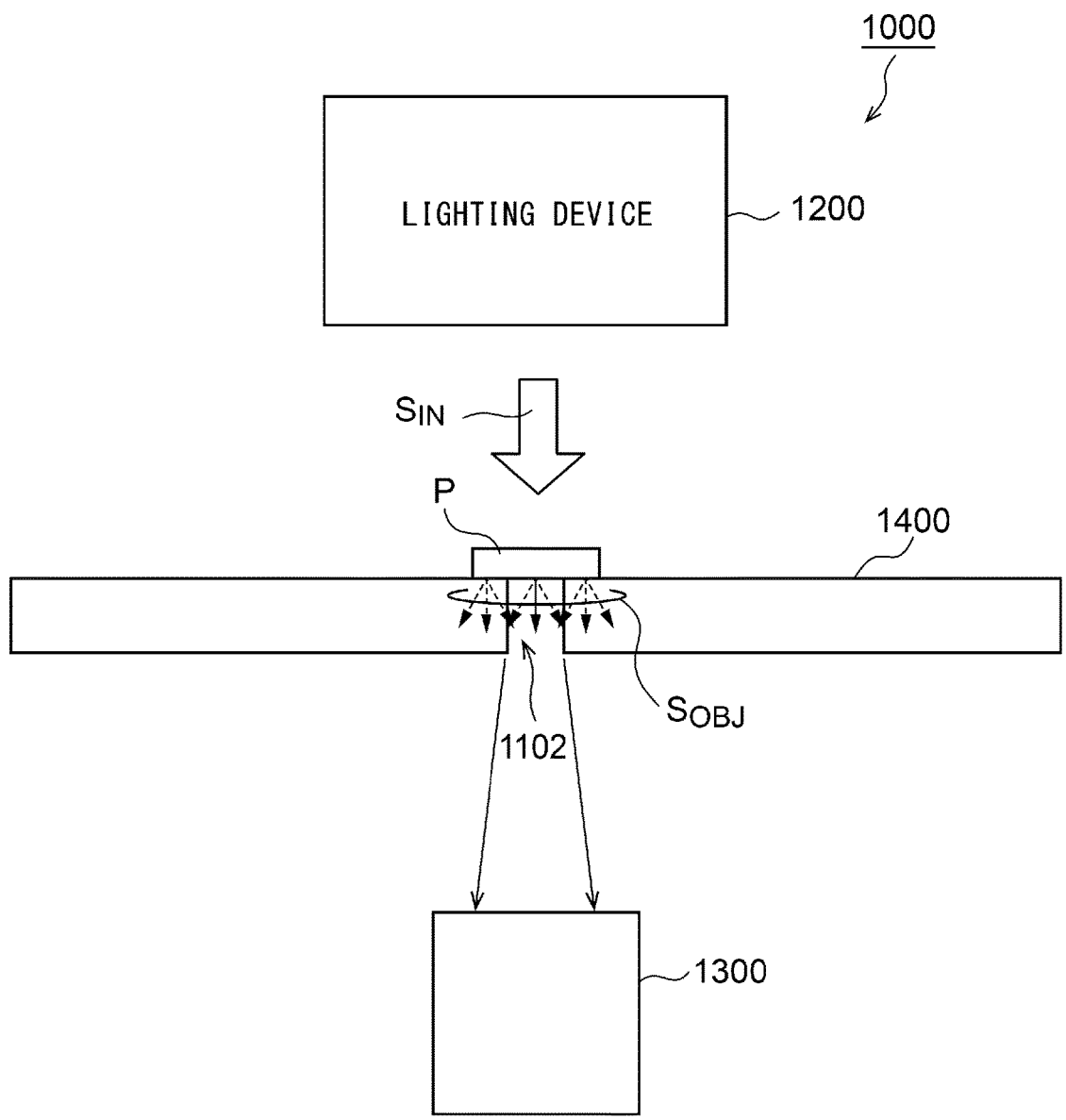
FIG. 1 is a view illustrating an inspection device of a transmission type studied by the present inventor.

An outline of some exemplary embodiments of the present disclosure will be described. This outline describes some concepts of one or more embodiments in a simplified manner for the purpose of basic understanding of the embodiments as a prelude to the detailed description that follows, and is not intended to limit the breadth of the invention or disclosure. Also, this outline is not a comprehensive outline of all possible embodiments and is not intended to limit the essential components of the embodiments. For convenience, the term "one embodiment" may be used to refer to one embodiment (example or modification) or a plurality of embodiments (examples or modifications) disclosed in the present specification.

The optical measurement device according to one embodiment includes a conveyance device that supports and conveys an object and includes a support portion that supports the object, a lighting device that irradiates a first surface of the object with measurement light having a wavelength changing over time through the support portion, and a light receiving device that detects diffusely transmitted light emitted from a second surface of the object.

According to this configuration, the diffusely transmitted light emitted from the object is not shielded by the support portion, and more light can be detected by the light receiving device, so that the measurement accuracy can be improved.

Note that the term "support" includes not only fixing the object but also holding the object in a certain range.

In one embodiment, the support portion may have an opening narrower than the object. The lighting device may irradiate the first surface of the object with the measurement light through the opening of the support portion.

In one embodiment, the conveyance device may include a plurality of support portions each supporting the object, and the plurality of support portions may each include a recessed portion provided on a common surface of the conveyance device.

The opening may be a through hole formed in a bottom surface of the recessed portion.

In one embodiment, the lighting device may include a folding mirror provided on a lower side of the conveyance device, and the folding mirror may reflect the measurement light incident from a side surface of the conveyance device towards the first face of the object.

In one embodiment, the lighting device may be provided on the lower side of the conveyance device without using the folding mirror.

In one embodiment, the light receiving device may include a light sensor having a size (outer dimension) smaller than the object, and a condensing optical system including a lens having a size (outer dimension) larger than the object. The present inventors have recognized that when a specific object is to be inspected, diffusely transmitted light that is the object light has low directivity and is emitted over a wide range. In this case, by using the lens larger than the object, the diffusely transmitted light can be condensed on the light sensor as much as possible.

In one embodiment, the light receiving device may include a light sensor, and may be configured such that a component of the diffusely transmitted light of the object emitted in a direction deviated from an optical axis of the measurement light is incident on the light sensor.

Note that the term "configured" is not limited to a case where there is a feature in the configuration, and includes a case where there is a feature in both the configuration and the arrangement, a case where there is a feature only in the arrangement, and the like. According to this optical measurement device, when the object is present, the object light attenuated by the object is incident on the light sensor, and when the object is not present, the measurement light is not incident on the light sensor, or even if the measurement light is incident, the intensity is very weak, so that the light sensor can be protected. In addition, the lighting device can be continuously operated regardless of presence or absence of the object, and a shutter or the like synchronized with the presence or absence of the object is not required.

In one embodiment, the measurement light may have a wavelength changing over time. In one embodiment, the measurement light may be pulsed light having a wavelength changing over time within one pulse.

Embodiment

Hereinafter, the present disclosure will be described based on a preferred embodiment with reference to the drawings. The same or equivalent components, members, and processing illustrated in the drawings are denoted by the same reference numerals, and redundant description will be omitted as appropriate. In addition, the exemplary embodiment is not intended to limit the disclosure, but is merely an example, and all features described in the exemplary embodiment and combinations thereof are not necessarily essential to the disclosure.

Dimensions (thickness, length, width, and the like) of each member described in the drawings may be enlarged or reduced for easy understanding as appropriate. Furthermore, the dimensions of the plurality of members do not necessarily indicate the magnitude relationship therebetween, and even if a certain member A is drawn thicker than another member B in the drawing, the member A may be thinner than the member B.

Figure 2:
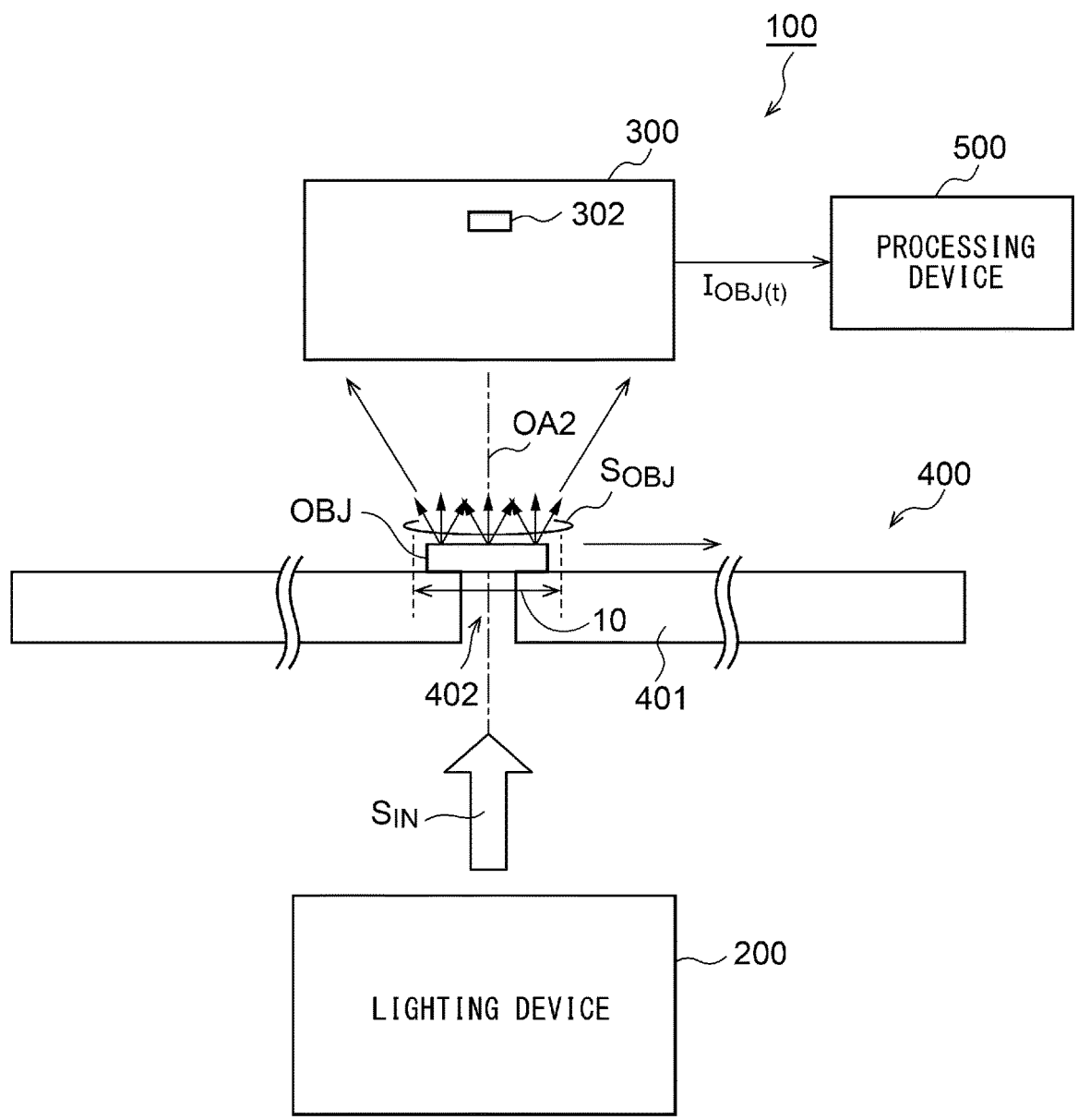
FIG. 2 is a block diagram of an optical measurement device according to an embodiment.

FIG. 2 is a block diagram of an optical measurement device 100 according to the embodiment. The optical measurement device 100 is a spectrometer that measures a transmission spectrum of an object OBJ, and mainly includes a lighting device 200, a light receiving device 300, a conveyance device 400, and a processing device 500. In some drawings, the lighting device 200, the light receiving device 300, and the like may be illustrated in a simplified form as a box, but this is not intended to house the respective constituent members in a single housing.

The conveyance device 400 conveys the object OBJ so as to cross an irradiation region 10.

The conveyance device 400 includes a support portion 401 and the object OBJ is supported in the support portion 401. The support portion 401 has an opening 402 narrower than the object OBJ at a position where the object OBJ is supported, and the support portion 401 supports the object OBJ such that the object OBJ straddles the opening 402. The width of the opening 402 is determined so that the object OBJ does not fall from the opening 402, and thus the width of the opening 402 may be narrower than the length of the object OBJ in the width direction.

The lighting device 200 irradiates the first surface (bottom surface) of the object OBJ present in the irradiation region 10 with the measurement light $S_{IN}$ having the wavelength changing over time from a lower side of the support portion 401 through the opening 402. In order to prevent the measurement light $S_{IN}$ from being shielded by the support portion 401, a beam diameter of the measurement light $S_{IN}$ is condensed smaller than the opening 402.

In the measurement light $S_{IN}$, a time and a wavelength are associated with each other in a one-to-one relationship. This is referred to as the measurement light $S_{IN}$ "having wavelength uniqueness". The lighting device 200 may be configured using a known technique, and for example, those described in Patent Literatures 1 and 2 can be used.

Figure 3:
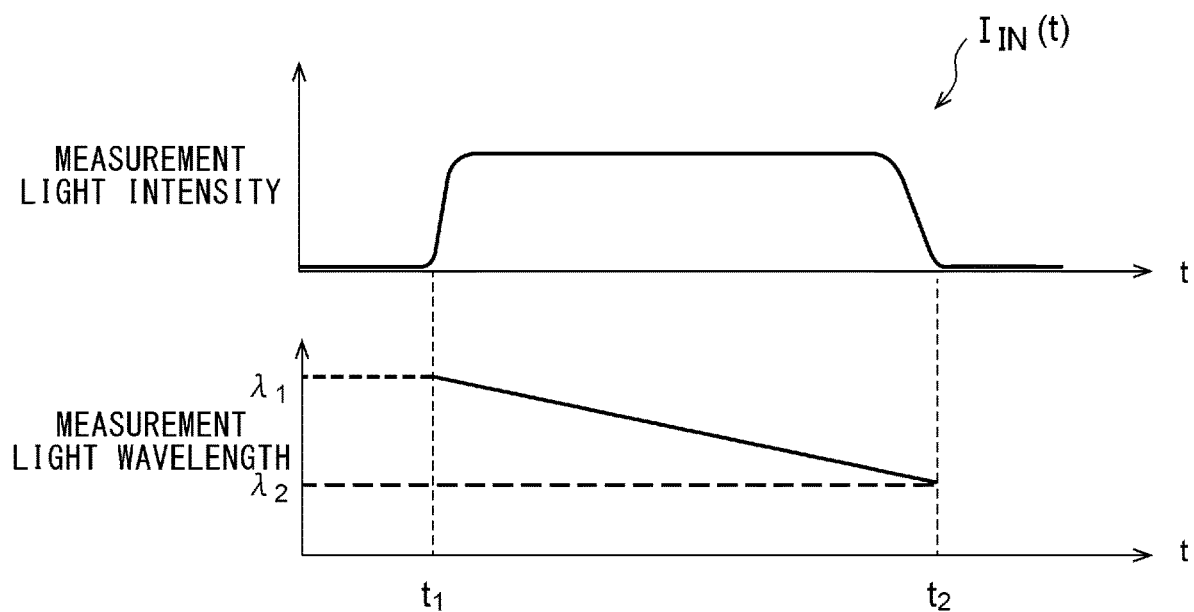
FIG. 3 is a graph showing measurement light $S_{IN}$.

FIG. 3 is a graph showing the measurement light $S_{IN}$. The upper part of FIG. 3 shows the intensity (time waveform) $I_{IN}(t)$ of the measurement light $S_{IN}$, and the lower part illustrates the time change of the wavelength λ of the measurement light $S_{IN}$.

In this example, the measurement light $S_{IN}$ is one pulse, the dominant wavelength is $\lambda_1$ at the leading edge, the dominant wavelength is $\lambda_2$ at the trailing edge, and the wavelength changes over time between $\lambda_1$ and $\lambda_2$ within one pulse. In this example, the measurement light $S_{IN}$ is a positive chirp pulse $(\lambda_1 > \lambda_2)$ having a frequency increasing with time, in other words, having a wavelength decreasing with time. Note that the measurement light $S_{IN}$ may be a negative chirp pulse having a wavelength increasing with time $(\lambda_1 < \lambda_2)$.

Returning to FIG. 2. The measurement light $S_{IN}$ is radiated to the bottom surface side of the object OBJ, passes through the object OBJ, and is emitted as transmitted light (Hereinafter, also referred to as object light.) $S_{OBJ}$ from the second surface (upper surface). The spectrum $I_{OBJ}(\lambda)$ of the object light $S_{OBJ}$ is expressed by an equation, where the spectrum of the measurement light $S_{IN}$ is $I_{IN}(\lambda)$ and the wavelength dependence of the transmittance of the object light $S_{OBJ}$ is $T(\lambda)$.

$$I_{OBJ}(\lambda) = T(\lambda) \times I_{IN}(\lambda) \quad (1)$$

The object light $S_{OBJ}$ may include normally transmitted light and diffusely transmitted light, but the present embodiment is particularly suitable for spectroscopic measurement of an object OBJ in which the diffusely transmitted light is dominant. The normally transmitted light is emitted in the same direction as an optical axis OA2 of the measurement light $S_{IN}$, whereas the object light $S_{OBJ}$ that is the diffusely transmitted light is widely emitted not only in a direction of the optical axis OA2 of the measurement light $S_{IN}$ but also in a direction different from the direction thereof. For example, when the direction of the optical axis OA2 is set to 0°, the diffusely transmitted light is emitted with an intensity distribution of cosine characteristics.

The light receiving device 300 is provided on the opposite side of the lighting device 200 across the support portion 401, in other words, on an upper side of the support portion 401, and detects the diffusely transmitted light emitted from the upper surface of the object OBJ. The light receiving device 300 includes a light sensor 302 that detects the diffusely transmitted light of the object OBJ as the object light $S_{OBJ}$. The light receiving device 300 may include a condensing optical system and the like in addition to the light sensor 302 as described later, but they are omitted in FIG. 2.

The light sensor 302 is a photoelectric conversion element that converts an optical signal into an electric signal, and examples thereof include a photodiode, an avalanche photodiode, a phototransistor, a photomultiplier tube (photomultiplier) using a photoelectric effect, and a photoconductive element using a change in electric resistance due to light irradiation.

An output of the light sensor 302 is converted into a digital detection signal by an A/D converter and supplied to the processing device 500. The detection signal indicates a time waveform $I_{OBJ}(t)$ of the object light $S_{OBJ}$.

The processing device 500 generates a spectrum $I_{OBJ}(\lambda)$ of the object light $S_{OBJ}$ based on an output signal of the light receiving device 300. Then, transmittance $T(\lambda)$ of the object OBJ is calculated based on the spectrum $I_{IN}(\lambda)$ of the measurement light $S_{IN}$ and the spectrum $I_{OBJ}(\lambda)$ of the object light $S_{OBJ}$.

$$T(\lambda) = I_{OBJ}(\lambda) / I_{IN}(\lambda) \quad (2)$$

A part of the measurement light $S_{IN}$ may be split into another path using a beam splitter or the like on the lighting device 200 side of the object OBJ, and the time waveform $I_{IN}(t)$ of the split measurement light $S_{IN}$ may be measured by a light receiving device (not illustrated in FIG. 2) different from the light receiving device 300 to obtain the spectrum $I_{IN}(\lambda)$ of the measurement light $S_{IN}$. Alternatively, when the stability of the measurement light $S_{IN}$ is high, the spectrum $I_{IN}(\lambda)$ measured in advance can be held and used.

Figure 4:
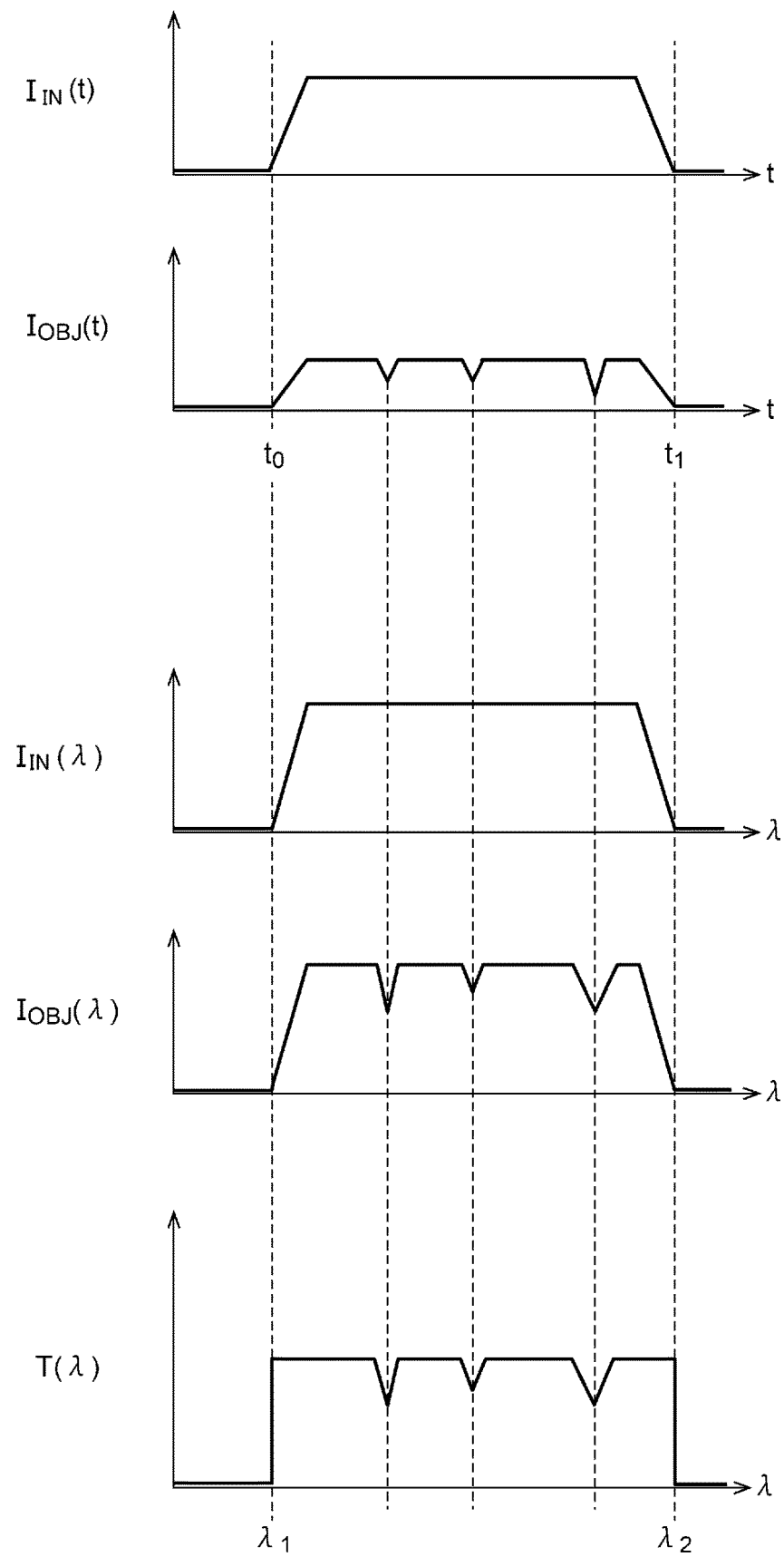
FIG. 4 is a graph for explaining spectroscopy by the optical measurement device in FIG. 2.

FIG. 4 is a graph for explaining spectroscopy by the optical measurement device 100 in FIG. 2. As described above, the time t and the wavelength λ of the measurement light $S_{IN}$ correspond to each other on a one-to-one basis, and thus the waveform $I_{IN}(t)$ of a time domain of the measurement light $S_{IN}$ can be converted into the spectrum $I_{IN}(\lambda)$ of a frequency domain.

The time waveform $I_{OBJ}(t)$ of the object light $S_{OBJ}$ generated from the measurement light $S_{IN}$ also has the time t and the wavelength λ corresponding to each other on a one-to-one basis. Therefore, the processing device 500 can convert the waveform $I_{OBJ}(t)$ of the object light $S_{OBJ}$ indicated by an output of the light receiving device 300 into the spectrum $I_{OBJ}(\lambda)$ of the object light $S_{OBJ}$.

The processing device 500 can calculate a transmission spectrum T(λ) of the object OBJ based on a ratio $I_{OBJ}(\lambda)/I_{IN}(\lambda)$ of the two spectra $I_{OBJ}(\lambda)$ and $I_{IN}(\lambda)$.

It is assumed that the relationship between the wavelength λ and the time t in the measurement light $S_{IN}$ is expressed by a function λ=f(t). Most simply, the wavelength λ linearly changes with respect to the time t according to a linear function. When the time waveform $I_{OBJ}(t)$ of the object light $S_{OBJ}$ decreases at a certain time $t_x$, it means that the transmission spectrum T(λ) has an absorption spectrum at a wavelength $\lambda_x = f(t_x)$.

Note that the processing in the processing device 500 is not limited thereto. The transmission spectrum T(λ) may be calculated by calculating a ratio $T(t)=I_{OBJ}(t)/I_{IN}(t)$ of two time waveforms $I_{OBJ}(t)$ and $I_{IN}(t)$ of time and then converting a variable t of the time waveform T(t) into λ.

The above is the configuration of the optical measurement device 100. According to the optical measurement device 100, the object OBJ is irradiated with the measurement light $S_{IN}$ from the support portion 401 side, and the diffusely transmitted light emitted from a surface of the object OBJ opposite to the support portion 401 is detected as the object light $S_{OBJ}$.

As a result, the object light $S_{OBJ}$ is not shielded by the support portion 401, and thus more object light $S_{OBJ}$ can be taken in by the light receiving device 300, and utilization efficiency of light can be improved.

Next, a specific example of the optical measurement device 100 will be described.

Example 1

Figure 5:
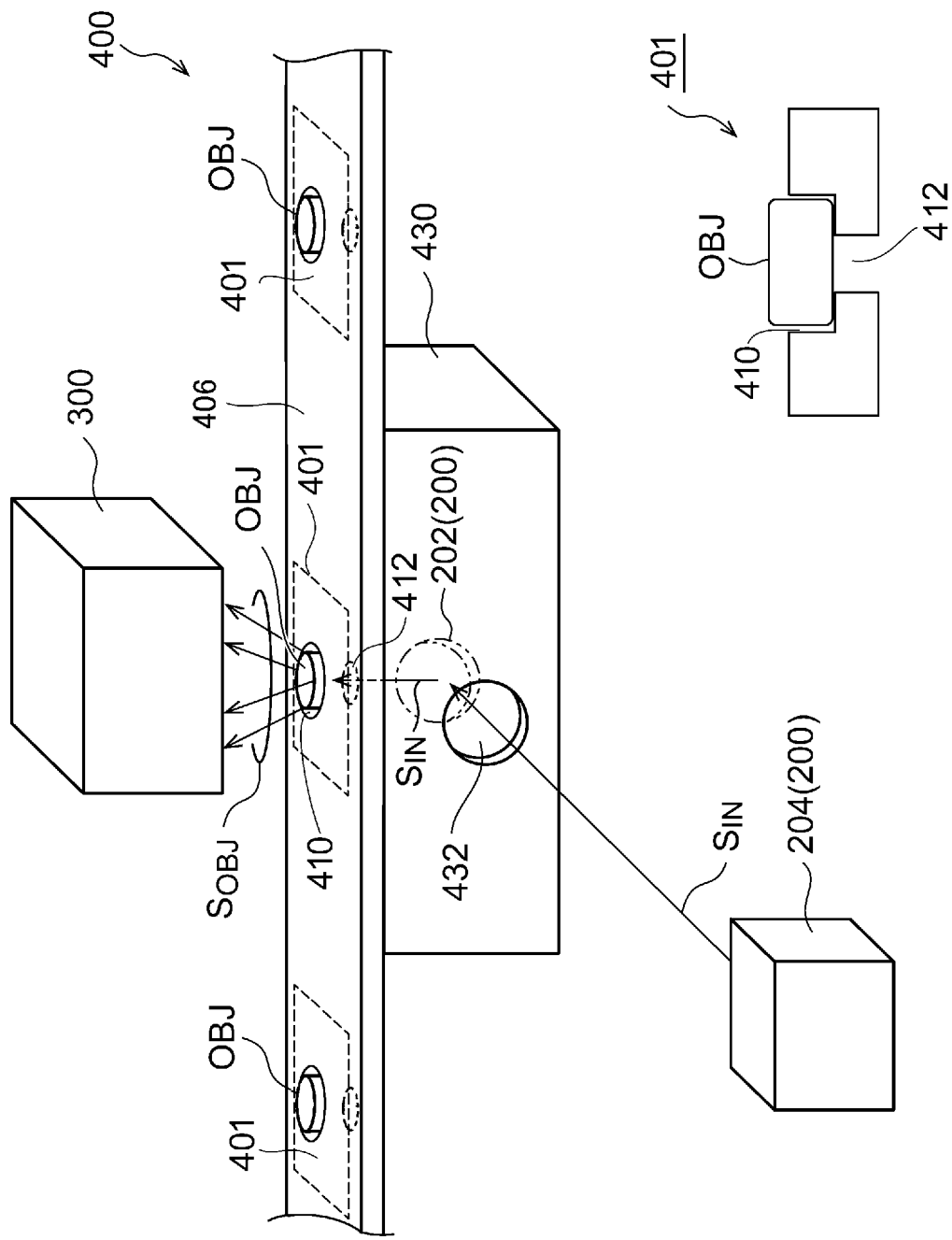
FIG. 5 is a view illustrating an optical measurement device according to Example 1.

FIG. 5 is a view illustrating an optical measurement device 100A according to Example 1. The conveyance device 400 includes a plurality of the support portions 401, and each of the support portions 401 is configured to be able to support (fix) the object OBJ. A cross-sectional view of the support portion 401 is illustrated in a lower part in FIG. 5. The support portion 401 has a recessed portion 410 into which the object OBJ fits. The recessed portion 410 is formed on a common surface 406 and has a larger diameter than the object OBJ. In addition, a through hole 412 having a smaller diameter than the object OBJ is formed in the bottom surface of the recessed portion 410. The through hole 412 corresponds to the above-described opening 402. The object OBJ is placed to straddle the through hole 412. The measurement light $S_{IN}$ passes through the through hole 412 and the bottom surface side of the object OBJ is radiated with the measurement light $S_{IN}$. The light receiving device 300 is provided on an upper side of the irradiation region 10 so as to face the upper surface of the object OBJ.

The conveyance device 400 further includes a suction box 430. A negative pressure is maintained inside the suction box 430 by an exhaust pump (not illustrated), the through hole 412 serves as an intake port, and the object OBJ is sucked to the through hole 412. With this configuration, the object OBJ can be prevented from falling off from the recessed portion 410.

The lighting device 200 includes a folding mirror 202. The folding mirror 202 is provided inside the conveyance device 400, more specifically, inside the suction box 430 and immediately below the through hole 412 that is the opening 402. A light source head 204 that generates the measurement light $S_{IN}$ is provided outside the suction box 430, and a window 432 through which the measurement light $S_{IN}$ passes is provided on a side surface of the suction box 430. The measurement light $S_{IN}$ is incident on the folding mirror 202 from the side surface of the conveyance device 400 through the window 432. The folding mirror 202 reflects the measurement light $S_{IN}$ toward the object OBJ. The size of a window 434 can be reduced as long as the measurement light $S_{IN}$ can pass through the window, and the influence on the pressure in the suction box 430 is sufficiently small. The window 434 may be a glass transparent to a wavelength band of the measurement light $S_{IN}$, and in this case, the influence on the pressure of the window 434 can be eliminated.

Example 2

Figure 6:
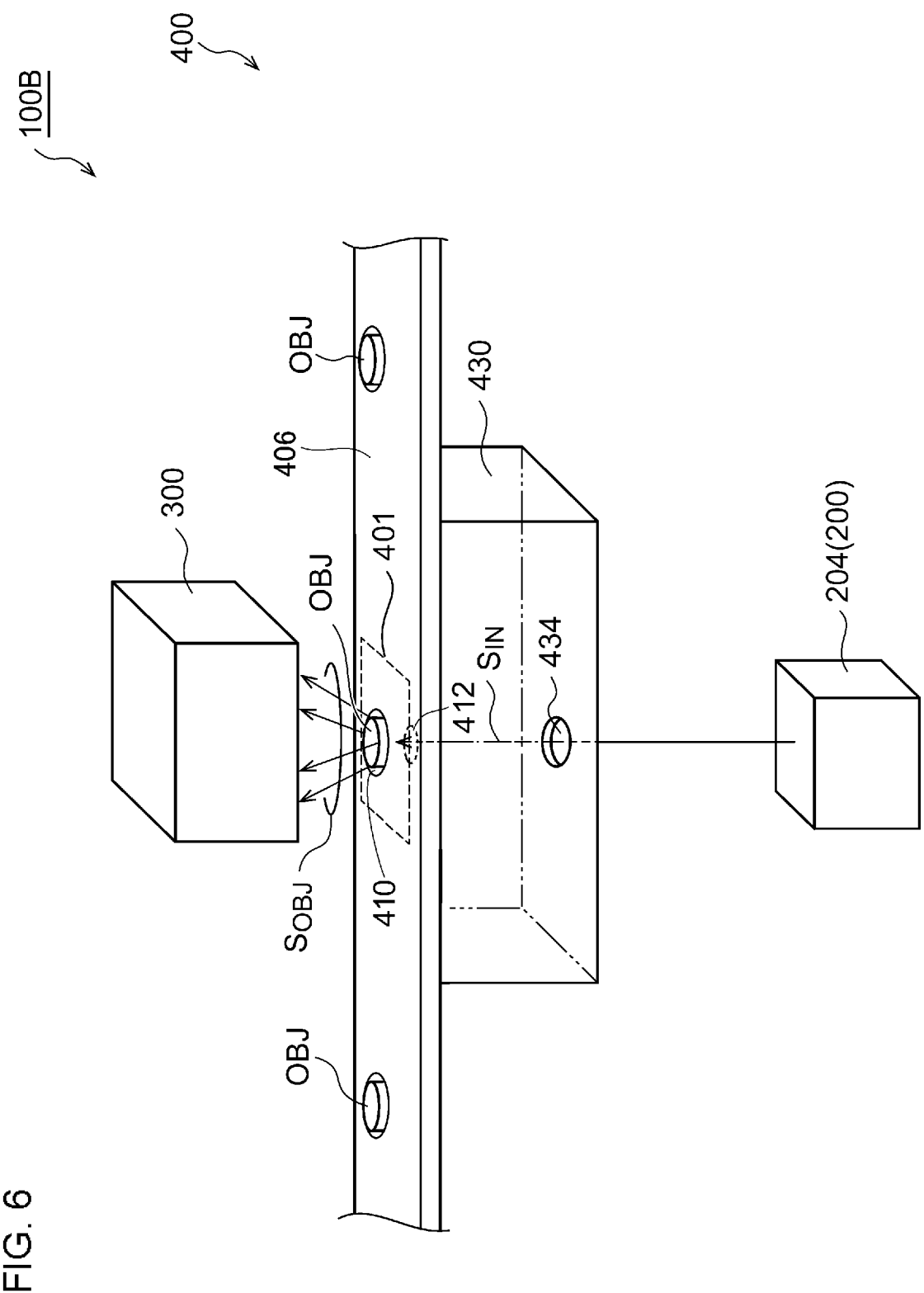
FIG. 6 is a view illustrating an optical measurement device according to Example 2.

FIG. 6 is a view illustrating an optical measurement device 100B according to Example 2.

In Example 2, the bottom surface of the object OBJ is directly irradiated with the measurement light $S_{IN}$ from the lower side of the conveyance device 400 without using the folding mirror. For example, a window 434 is provided on a bottom surface of the suction box 430, the measurement light $S_{IN}$ can pass through the window 434 and the through hole 412, and the bottom surface of the object OBJ can be irradiated.

In Example 2, the folding mirror is not required as compared with Example 1, and thus the configuration can be simplified.

In Example 1 and Example 2, when the object OBJ is not sucked, the suction box 430 can be omitted.

Example 3

Figure 7:
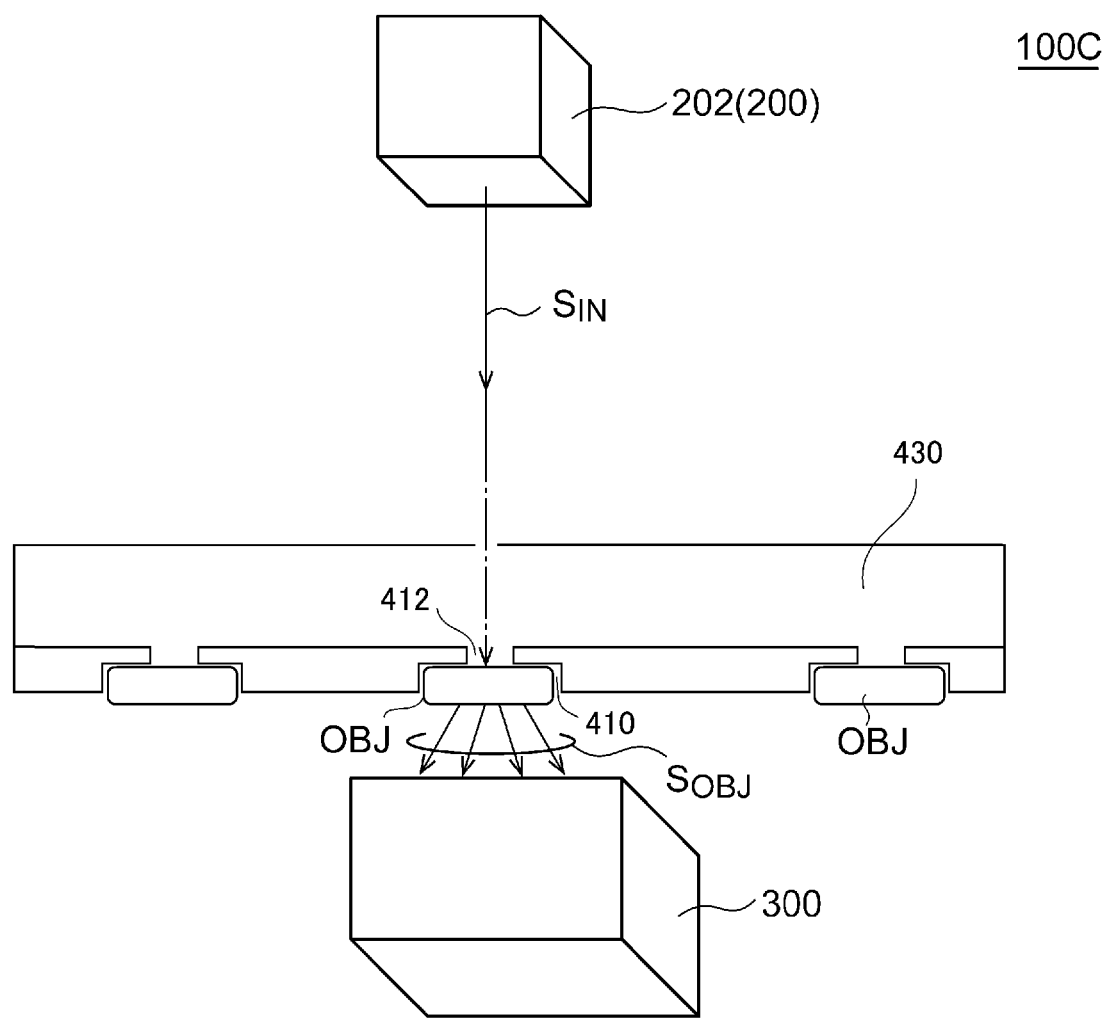
FIG. 7 is a view illustrating an optical measurement device according to Example 3.

FIG. 7 is a view illustrating an optical measurement device 100C according to Example 3. In Example 3, vacuum suction by the suction box 430 is used to support the object OBJ against gravity in the recessed portion 410. The light receiving device 300 is disposed on the lower side of the conveyance device 400. Similar to Example 1, a folding mirror may be disposed inside the suction box 430, and the measurement light $S_{IN}$ generated by the light source head 204 may be incident on the folding mirror from the side of the suction box 430.

Example 4

Figure 8A:
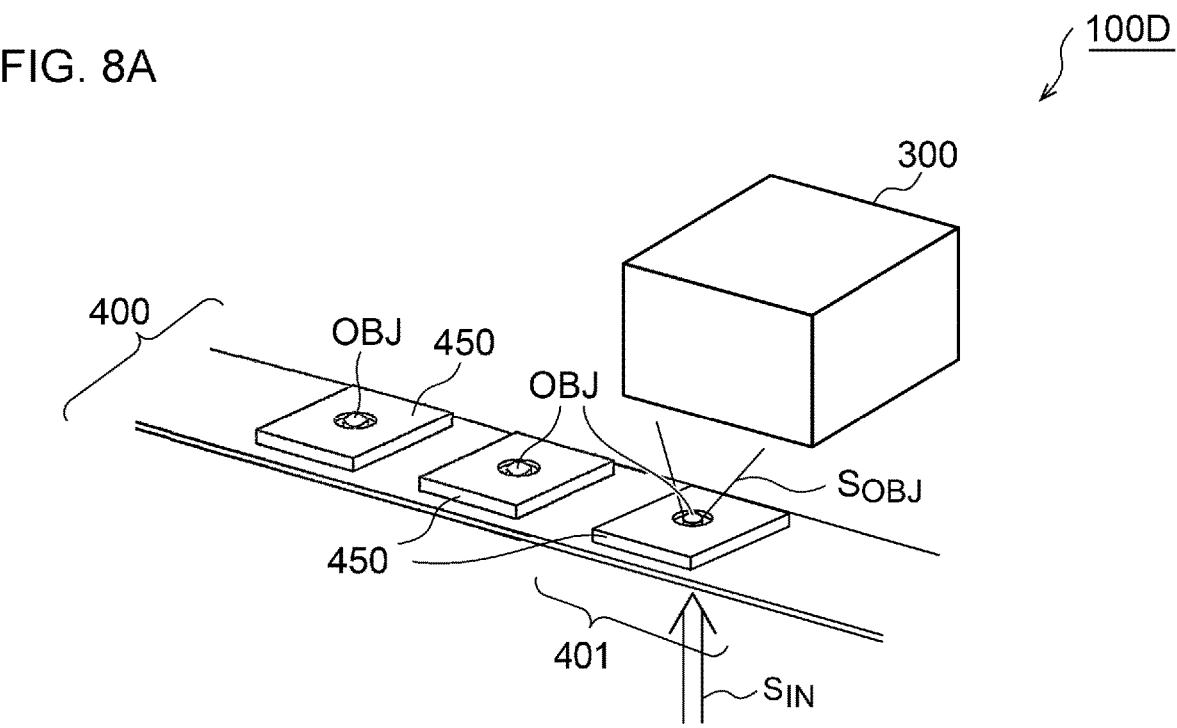
FIGS. 8A to 8C are views each illustrating a configuration example of a support portion 401.
Figure 8B:
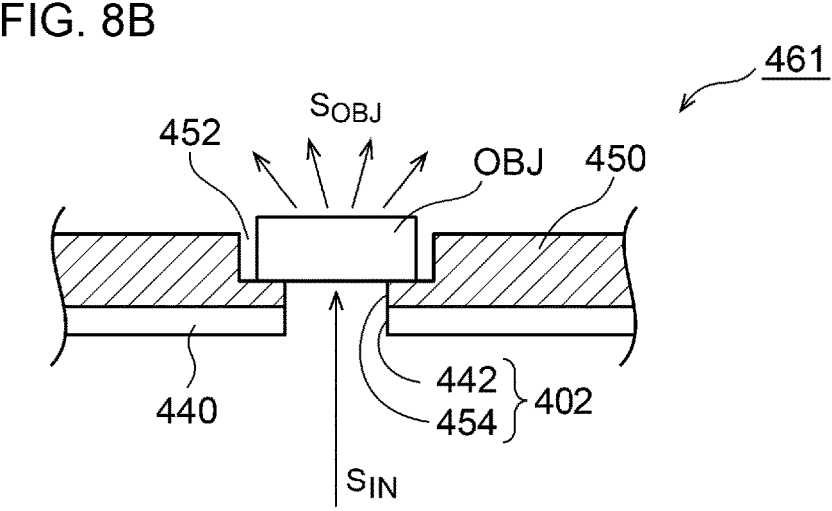
Figure 8C:
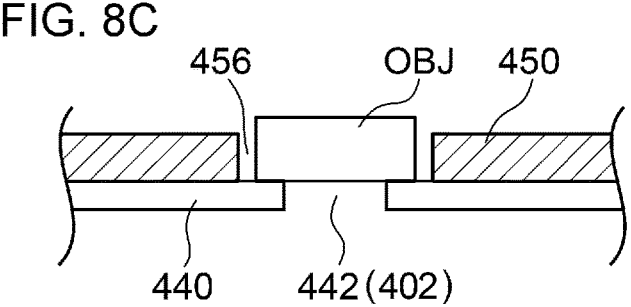

FIGS. 8A to 8C are views each illustrating a configuration example of the support portion 401. The conveyance device 400 is a movable table, and includes a plurality of holders 450 formed integrally with or separably from a table 440. The plurality of holders 450 are disposed at equal intervals or at unequal intervals in the conveyance direction.

FIG. 8B illustrates a cross-sectional view of the support portion 401. In the holder 450, a recess 452 having a diameter slightly larger than the object OBJ and an opening 454 having a diameter smaller than the object OBJ are formed. The object OBJ is supported and conveyed while being accommodated in the recess 452 of the holder 450.

An opening 442 is formed in the table 440 so as to overlap the opening 454. The opening 442 and the opening 454 correspond to the opening 402 described above.

The object OBJ to be inspected is mounted in the recess 452 of the holder 450 on the upstream side (not illustrated).

As illustrated in FIG. 8C, a recess 456 may be formed so as to penetrate the holder 450.

Example 5

Figure 9:
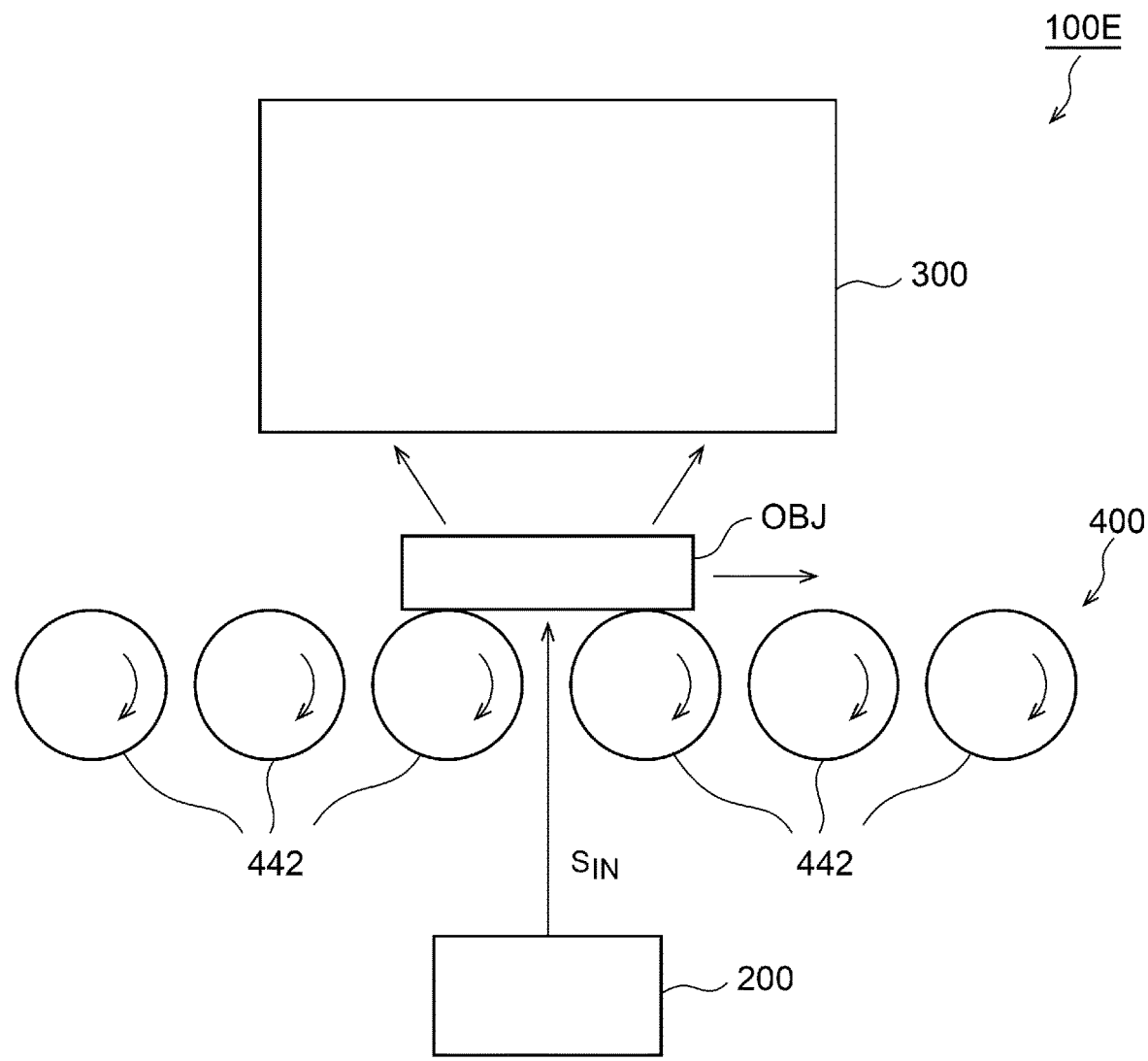
FIG. 9 is a view illustrating an optical measurement device according to Example 5.

FIG. 9 is a view illustrating an optical measurement device 100E according to Example 5. In Example 5, the conveyance device 400 is a roller conveyor, and includes a plurality of rollers 422 provided apart from each other in the conveyance direction. In this Example 5, a gap between two rollers 422 adjacent to each other can be used as the opening 402 described above.

Example 6

When the lighting device 200 can be sufficiently downsized, the lighting device 200 may be disposed in the suction box 430.

Example 7

Figure 10:
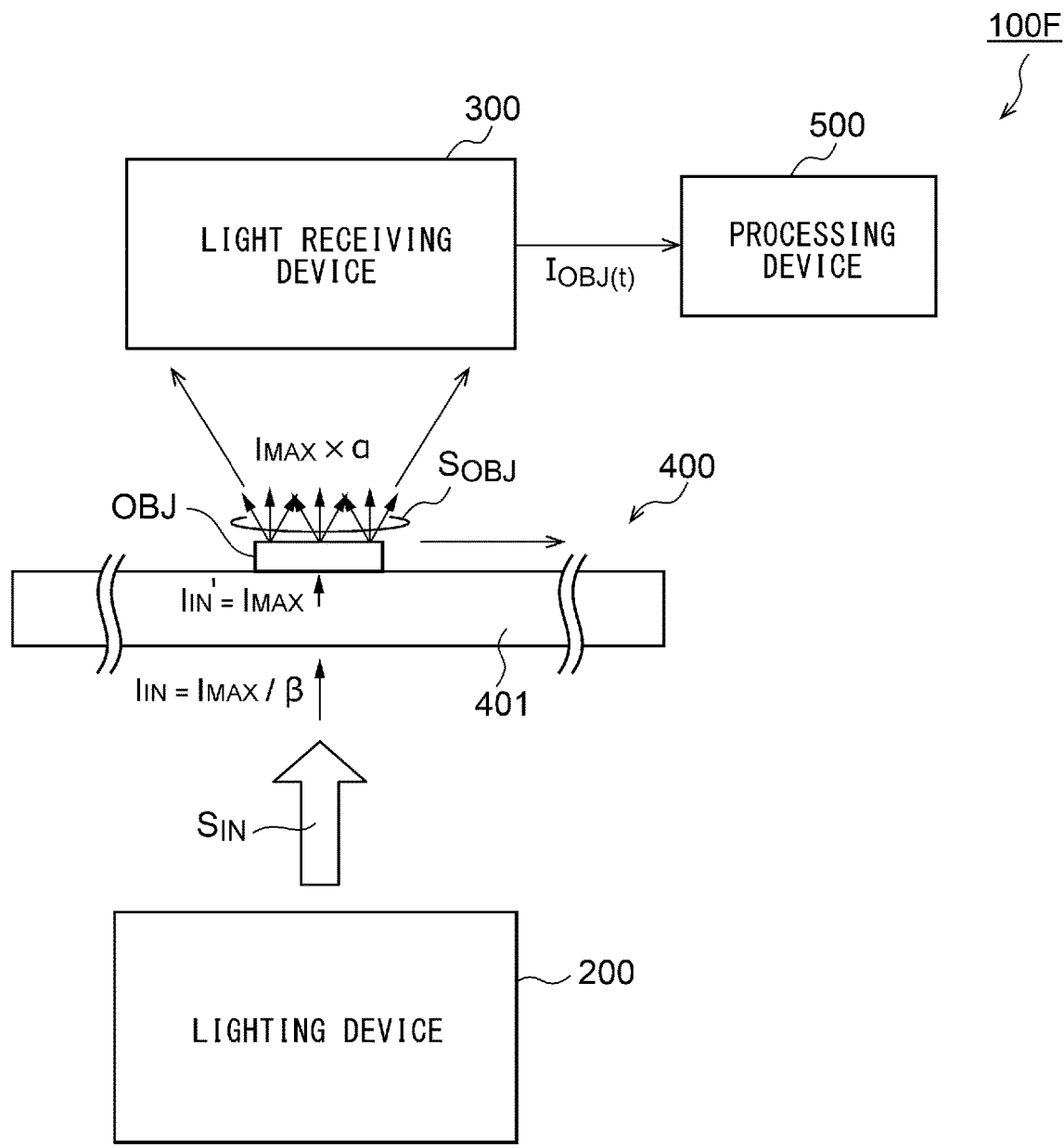
FIG. 10 is a view illustrating an optical measurement device according to Example 7.

FIG. 10 is a view illustrating an optical measurement device 100F according to Example 7. In the above description, the case where the opening 402 is provided in the support portion 401 of the conveyance device 400 has been described, but the present invention is not limited thereto. In Example 7, the opening 402 of the support portion 401 is omitted, and instead, the support portion 401 is made of a transparent material such as glass or resin. The lighting device 200 irradiates the first surface of the object OBJ with the measurement light $S_{IN}$ having the wavelength changing over time through the transparent support portion 401. The light receiving device 300 detects the diffusely transmitted light $S_{OBJ}$ emitted from the second surface of the object OBJ.

Figure 11:
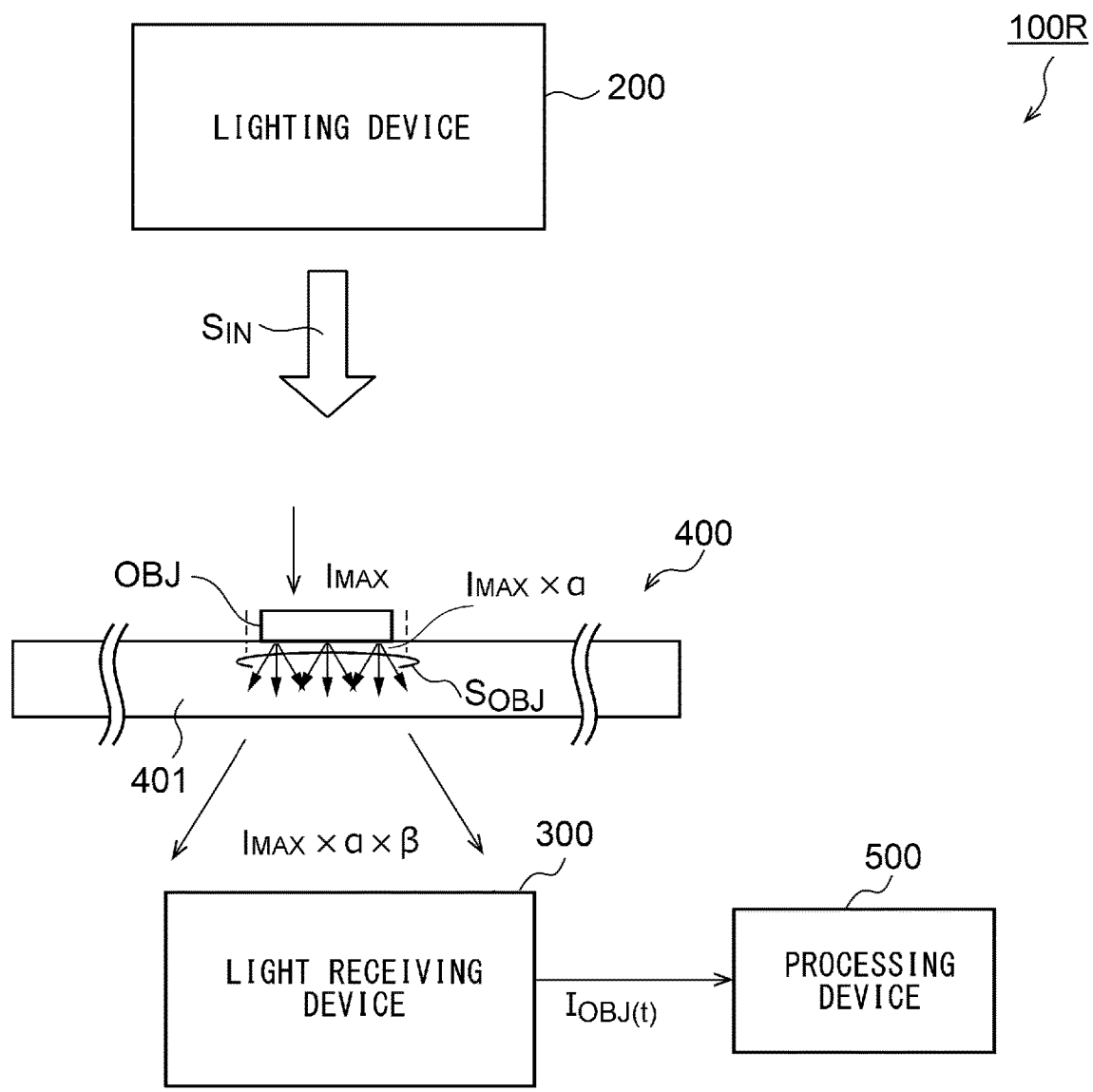
FIG. 11 is a view illustrating an optical measurement device according to a comparative technique.

Advantages of the optical measurement device 100 F will be described. The advantages of the optical measurement device 100 F are clarified by comparison with a comparative technique. FIG. 11 illustrates an optical measurement device 100R according to the comparative technique. In the comparative technique, the support portion 401 is made of glass or the like, the object OBJ is irradiated with the measurement light $S_{IN}$ from the upper side, and the object light $S_{OBJ}$ is measured by the light receiving device 300 on the lower side of the support portion 401.

The maximum incident intensity $I_{DET(MAX)}$ of the light incident on the light receiving device 300 R is expressed as $$I_{DET(MAX)} = I_{MAX} \times \alpha \times \beta,$$

where α is the transmittance of the object light OBJ, B is the transmittance of the support portion 401, and $I_{MAX}$ is the maximum intensity with which the object OBJ can be irradiated, and as the transmittance β of the support portion 401 decreases, the maximum incident intensity $I_{DET(MAX)}$ decreases, and the measurement accuracy decreases.

On the other hand, in Example 7, the intensity $I_{IN}$ of the light emitted from the lighting device 200 can be adjusted such that the intensity $I_{IN'}=I_{IN}\times\beta$ of measurement light $S_{IN'}$ transmitted through the support portion 401 becomes the maximum intensity $I_{MAX}$.

$$I_{IN} = I_{MAX}/\beta$$

At this time, the maximum incident intensity $I_{DET(MAX)}$ of the light incident on the light receiving device 300 is expressed as $$I_{DET\ (MAX)} = I_{IN} \times \beta \times \alpha = I_{MAX} \times \alpha,$$

and the light receiving device 300 can detect more light without being affected by attenuation and light shielding in the support portion 401, and the measurement accuracy can be improved.

Light Receiving Device

The present inventors have recognized that when an object such as food and drink obtained by solidifying powder in a solid state is to be inspected, the diffusely transmitted light that is the object light $S_{OBJ}$ has low directivity and is emitted over a wide range. In the case of an object having extremely low transmittance (For example, when a fine powder is hardened to have a thickness of about 3 mm, the transmittance is several % or less, more specifically, 1% or less.), as much object light $S_{OBJ}$ as possible is required to be detected for highly accurate spectroscopy.

Figure 12:
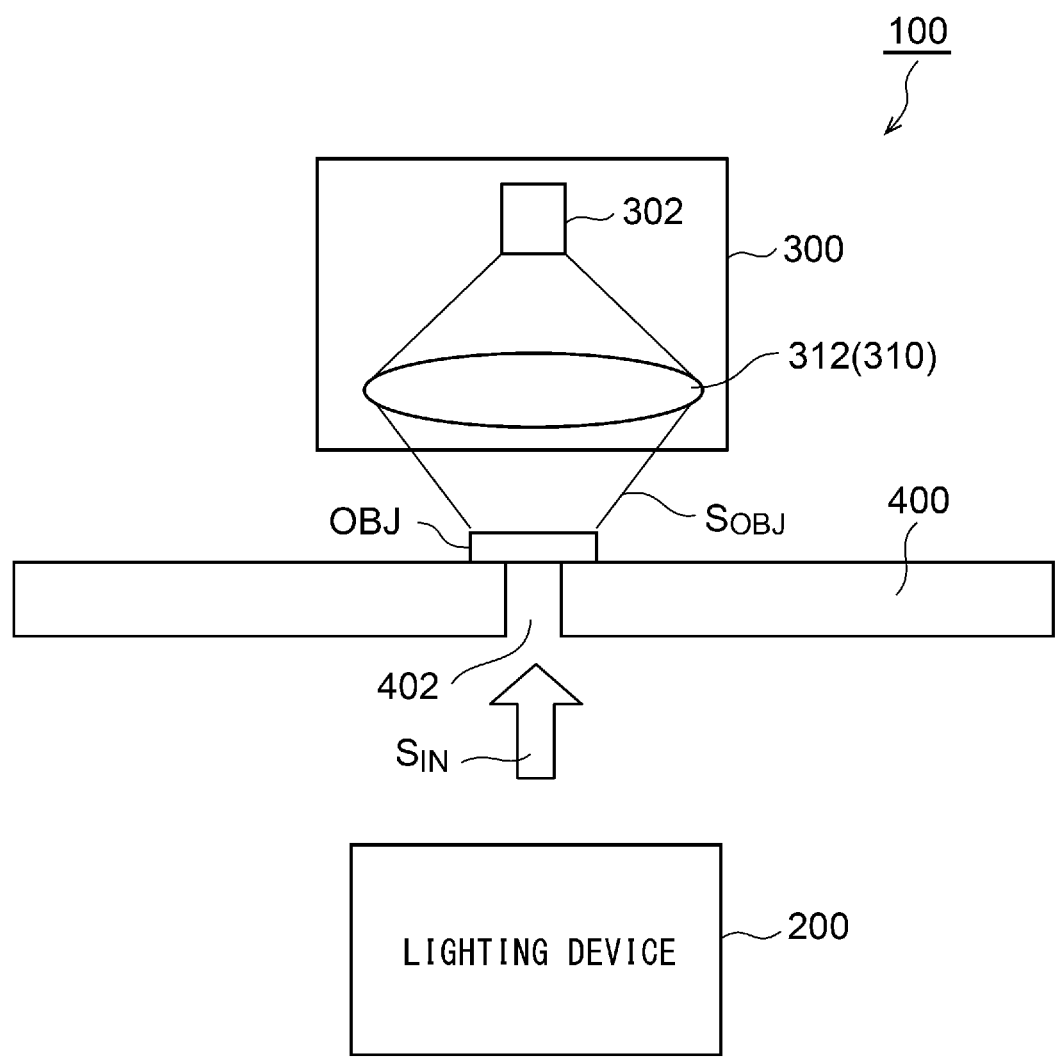
FIG. 12 is a view illustrating a configuration example of a light receiving device.

FIG. 12 is a view illustrating a configuration example of the light receiving device 300. The light receiving device 300 includes the light sensor 302 and a condensing optical system 310. In the spectroscopy using the chirped pulsed light, high-speed response of the light sensor 302 is required, and the response of the light sensor 302 is more advantageous as the area thereof is smaller. Therefore, as a light receiving portion of the light sensor 302 having sensitivity, a portion smaller than the object OBJ may be used, and for example, a portion having a diameter of about 0.5 to 1 mm may be used. On the other hand, the condensing optical system 310 is provided in order to cause the object light $S_{OBJ}$ diffused in a wide range from the object OBJ to be incident on the light sensor 302 having the smaller light receiving portion. The condensing optical system 310 can typically use one or a plurality of lenses 312.

The condensing optical system 310 includes the lens 312 having a diameter sufficiently larger than the object OBJ. By using the lens 312 larger than the object OBJ, the diffusely transmitted light can be condensed on the light sensor 302 as much as possible.

Applications

Figure 13:
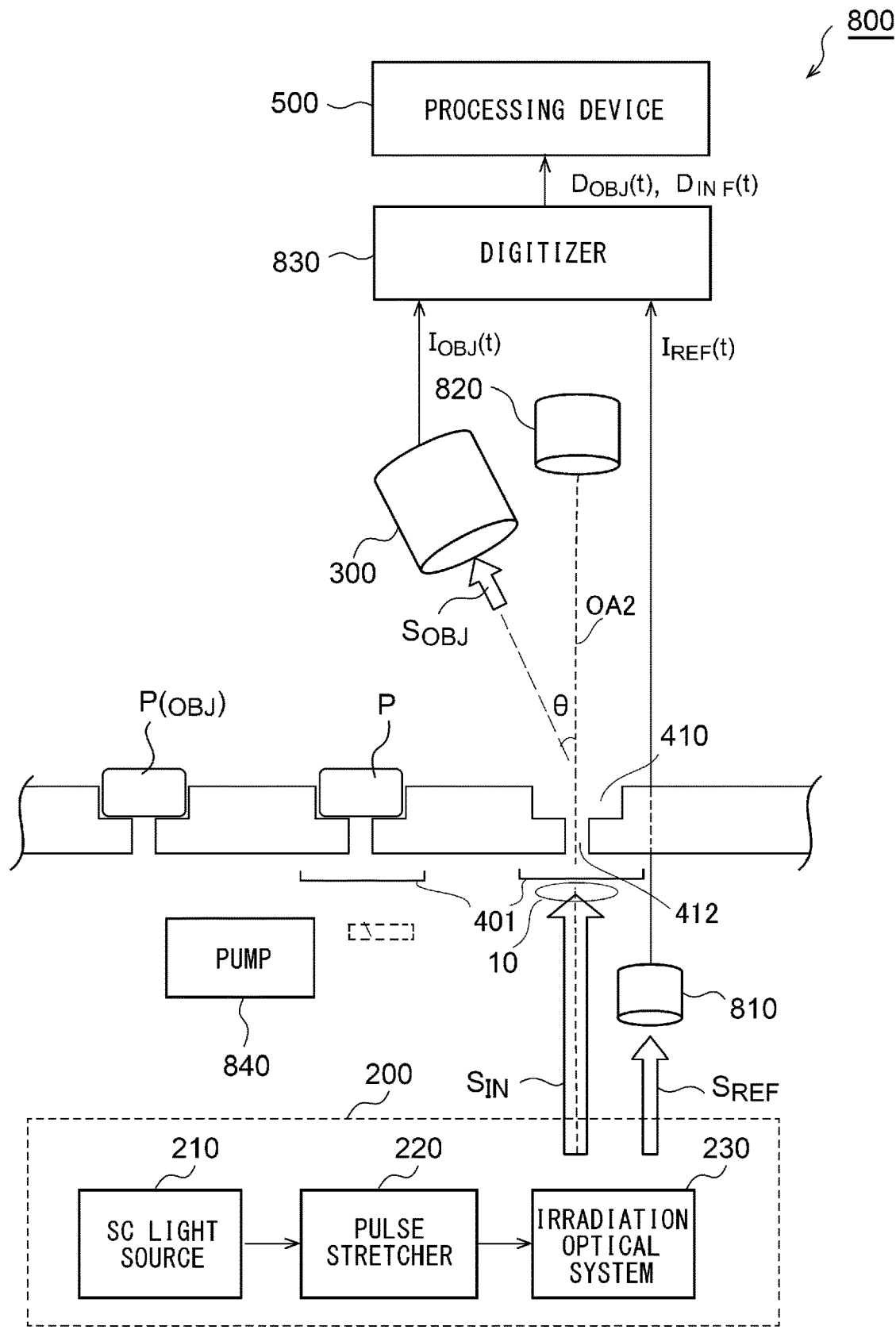
FIG. 13 is a view illustrating an inspection device that is one embodiment of an optical measurement device.

Next, applications of the optical measurement device 100 according to the embodiment will be described. The optical measurement device 100 can be used for an inspection device for the product such as food and drink obtained by solidifying powder in a solid state. FIG. 13 is a view illustrating an inspection device 800 that is one embodiment of the optical measurement device 100. The inspection device 800 inspects a large amount of the product P such as food and drink and determines whether the product P is good. In the case of food and drink, the transmittance thereof is on the order of 1/100 to 1/1000.

As described with respect to the optical measurement device 100, the inspection device 800 includes the lighting device 200, the light receiving device 300, the conveyance device 400, and the processing device 500. Further, the inspection device 800 includes a light receiving device 810, a beam damper 820, a digitizer 830, and a pump 840.

The lighting device 200 includes a light source 210, a pulse stretcher 220, and an irradiation optical system 230. The light source 210 generates coherent pulsed light having a broad continuous spectrum in a continuous spectrum of at least 10 nm, specifically in the near infrared region of 900 to 1300 nm. The light source 210 may be a super continuum (SC) light source including a pulsed laser and a nonlinear element. As the pulse laser, a mode-locked laser, a microchip laser, a fiber laser, or the like can be used. As the nonlinear element, a nonlinear fiber such as a photonic crystal fiber can be used.

The pulse stretcher 220 extends the pulse width of the pulsed light generated by the light source 210 in such a manner that the time and the wavelength correspond to each other on a one-to-one basis. The pulse stretcher 220 may include one wavelength dispersion fiber.

Alternatively, the pulse stretcher 220 may include a demultiplexer that splits the pulsed light into a plurality of paths for each wavelength, a plurality of fibers (fiber bundle) that gives a different delay to each of the plurality of paths, and a multiplexer that recombines outputs of the plurality of fibers. The demultiplexer can include planar lightwave circuits (PLC), and may specifically include array waveguide grating (AWG). The plurality of fibers constituting the fiber bundle has different lengths.

The support portion 401 of the conveyance device 400 includes the recessed portion 410. A plurality of the products P are each placed inside the recessed portion 410 by a mounter (not illustrated) on the upstream side (left side in the drawing). The conveyance device 400 moves the plurality of support portions 401 in the arrangement direction (right direction in the drawing) thereof. Of the surfaces of the recessed portion 410, a surface on which the product P is placed is referred to as a front surface, and the opposite surface is referred to as a back surface.

The irradiation optical system 230 irradiates the irradiation region 10 with the expanded pulse as the measurement light $S_{IN}$. The irradiation region 10 is defined at a passing portion of the product P, that is, a passing portion of the recessed portion 410. The irradiation optical system 230 can include a transmission optical system such as a lens, a reflection optical system such as a mirror, or a combination thereof. As the recessed portion 410 moves, the plurality of products P sequentially cross the irradiation region 10.

The light source 210 repeatedly generates pulsed light at a predetermined frequency (cycle). An operating frequency of the light source 210 may be determined according to a moving speed of the recessed portion 410, that is, the conveying speed of the product P. The operating frequency is determined such that the same product P is irradiated with a plurality of pieces of the measurement light $S_{IN}$ while one product P is present in the irradiation region 10.

The operation of the light source 210 is independent of the operation of the conveyance device 400, in other words, the position of the product P. Therefore, even when the product P is not present in the recessed portion 410, the irradiation region 10 is repeatedly irradiated with the measurement light $S_{IN}$.

The light receiving device 300 is provided on an upper side of the recessed portion 410. The through hole 412 is formed in the bottom surface of the recessed portion 410. The through hole 412 is formed in order to guide the measurement light $S_{IN}$ from the irradiation optical system 230 to the bottom surface of the product P.

The pump 840 may be provided on the back surface side of the recessed portion 410. The pump 840 constitutes a suction means, and the product P is sucked to the recessed portion 410 by setting the back surface side of the recessed portion 410 to a negative pressure, and the product P can be prevented from falling off from the recessed portion 410 along with the conveyance of the product P.

The light receiving device 300 measures the time waveform $I_{OBJ}(t)$ of the object light $S_{OBJ}$. The beam damper 820 is provided on the optical axis OA2 of the measurement light $S_{IN}$ in order to prevent stray light.

The light receiving device 810 is provided in order to measure the spectrum of the measurement light $S_{IN}$. The irradiation optical system 230 splits a part of the measurement light $S_{IN}$ into another arm as reference light $S_{REF}$ using a beam splitter or the like. The light receiving device 810 measures a time waveform $I_{REF}(t)$ of the reference light $S_{REF}$ split into another arm. The time waveform $I_{REF}(t)$ is equivalent to the time waveform $I_{IN}(t)$ of the measurement light $S_{IN}$.

The digitizer 830 includes an A/D converter, samples outputs of the light receiving device 300 and the light receiving device 810, that is, time waveforms $I_{OBJ}(t)$ and $I_{REF}(t)$ at a predetermined sampling frequency, and converts the sampled time waveforms into waveform data $D_{OBJ}(t)$ and $D_{IN}(t)$ of digital signals. In the case of using the light receiving devices 300 and 810 of digital outputs, the digitizer 830 can be omitted.

The processing device 500 processes the waveform data $D_{OBJ}(t)$ and $D_{IN}(t)$ of digital to obtain a transmission characteristic (or absorption characteristic) $T(\lambda)$ of the product P. The processing device 500 may be implemented in a combination of general or special purpose computers including a storage medium such as a processor, a memory, a hard disk, and the like, and a software program. The processing of the processing device 500 is as described above.

According to the inspection device 800, the product P is irradiated with the measurement light $S_{IN}$ from the conveyance device 400 side, and thus the object light $S_{OBJ}$ can be prevented from being shielded by the through hole 412, and more object light $S_{OBJ}$ can be detected by the light receiving device 300.

Note that in the inspection device 800 in FIG. 13, when the product P is not present in the recessed portion 410, the measurement light $S_{IN}$ passes through the through hole 412 and leaks to the light receiving device 300 side. Assuming that the light receiving device 300 is disposed on the optical axis OA2 of the measurement light $S_{IN}$, the measurement light $S_{IN}$ having a high intensity is directly incident on the light sensor 302 when the product P is not present on the optical axis OA2, which is not preferable. Therefore, the light receiving device 300 may be configured such that the measurement light $S_{IN}$ is not incident on the light sensor 302 when the product P is not present in the recessed portion 410.

For example, the light receiving device 300 is configured such that a component $S_e$ of the measurement light $S_{IN}$ of the diffusely transmitted light (object light $S_{OBJ}$) of the object OBJ emitted in a direction (deviation angle is θ) deviated from the optical axis OA2 is incident on the light sensor 302.

Note that the object light $S_{OBJ}$ may be incident on an incident aperture of the light receiving device 300, as long as the object light $S_{OBJ}$ in the direction of the optical axis OA2 is not incident on the light sensor 302.

Thus, the light receiving device 300 can be protected when the product P is not present in the recessed portion 410. At this time, the light source 210 of the lighting device 200 can be freely running asynchronously with the operation of the conveyance device 400, and shutter control synchronized with the operation of the conveyance device 400 is also not required.

The embodiments merely illustrate the principle and applications of the present invention, and many modifications and changes in arrangement can be made in the embodiments without departing from the spirit of the present invention defined in the claims.

What is claimed is:

1. An optical measurement device comprising:
a conveyance device configured to support and convey an object and including a support portion configured to support the object;
a lighting device configured to irradiate a first surface of the object with measurement light having a wavelength changing over time through the support portion, wherein the measurement light is coherent laser light; and
a light receiving device configured to detect diffusely transmitted light emitted from a second surface of the object, wherein
the support portion has an opening narrower than the object,
the lighting device irradiates the first surface of the object with the measurement light through the opening of the support portion,
a negative pressure is maintained inside the conveyance device, and
the opening serves as an intake port such that the object is sucked to the conveyance device.

2. The optical measurement device according to claim 1, wherein the conveyance device includes a plurality of the support portions each configured to support the object, each of the plurality of support portions including a recessed portion provided on a common surface of the conveyance device, and the opening is a through hole formed in a bottom surface of the recessed portion.

3. The optical measurement device according to claim 1, wherein the lighting device includes a light source structured to generate the measurement light,
the conveyance device has a window through which the measurement light is introduced into the conveyance device, and
the lighting device includes a folding mirror provided inside the conveyance device, the folding mirror reflects the measurement light which has propagated through the window toward the first surface of the object.

4. The optical measurement device according to claim 1, wherein the light receiving device includes:
a light sensor having a size smaller than the object; and
a condensing optical system including a lens having a size larger than the object.

5. The optical measurement device according to claim 1, wherein the light receiving device includes a light sensor, and a component of the diffusely transmitted light of the object emitted in a direction deviated from an optical axis of the measurement light is incident on the light sensor.

6. An optical measurement device comprising:
a conveyance device configured to support and convey an object, and including a support portion configured to support the object;
a lighting device configured to irradiate a first surface of the object with measurement light having a wavelength changing over time, wherein the measurement light is coherent laser light; and
a light receiving device configured to detect diffusely transmitted light emitted from a second surface of the object,
wherein the light receiving device includes:
a light sensor having a size smaller than the object; and
a condensing optical system including a lens having a size larger than the object,
and
the support portion has an opening narrower than the object, the lighting device irradiates the first surface of the object with the measurement light through the opening of the support portion, a negative pressure is maintained inside the conveyance device, and the opening serves as an intake port such that the object is sucked to the conveyance device.

* * * * *